2,558,434

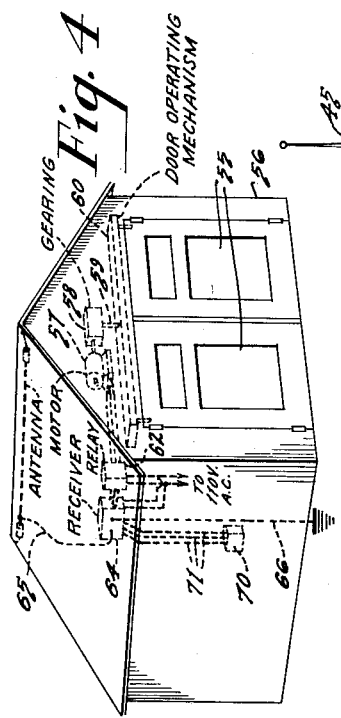
June 26, 1951 — A. H. HOFBERG — 2,558,434
REMOTE CONTROL SYSTEM FOR AUTOMOTIVE VEHICLES AND THE LIKE
Filed May 28, 1948
Inventor
Alf H. Hofberg
Attorney Patented June 26, 1951

UNITED STATES PATENT OFFICE 2,558,434

REMOTE-CONTROL SYSTEM FOR AUTOMOTIVE VEHICLES AND THE LIKE

Alf H. Hofberg, Medford, N. J., assignor to Radio Corporation of America, a corporation of Delaware Application May 28, 1948, Serial No. 29,897

4 Claims. (Cl. 250—17)

The present invention relates to remote control systems for automotive vehicles and the like, whereby a control function in the vehicle may be transmitted to and control remotely located apparatus, such as operating mechanisms for garage doors and the like.

Systems of this character have been proposed heretofore, and generally involve pulse signal transmission by radio wave or electromagnetic coupling, and require constantly energized and complicated electron tube stand-by means for producing and transmitting the control function, together with similar stand-by receiving and operating means at the remotely located point. Such systems thus require complicated and costly apparatus such as regular transmitter and receiver means, and inherently involve a condition of operation requiring constant energization of a plurality of electronic tubes or the like. This further involves high maintenance cost and the liability that such tubes and apparatus may at needed times fail to function because of burn-out of one or more of the tubes in either the transmitting or the receiving system.

One form of prior art system requires magnetic pick-up coils and conductors buried in the ground along the approach to the garage for the vehicle, and transmitting apparatus in the vehicle for relaying a pulse or a series of pulses to the coils, all of which is costly both in installation and maintenance, and is further complicated. The use of transmitters energized from the car battery are also known and obviously involve high cost for performing the simple function required, which is generally that of opening and closing the garage doors from the vehicle.

It is, therefore, a primary object of this invention, to provide an improved remote control system for automotive vehicles and the like which is simple and effective in construction and operation and which obviates the many disadvantages and undesirable features and characteristics of prior known systems.

It is a further object of the invention, to provide an improved remote control system for automotive vehicles and the like which provides for operating controlled apparatus remotely from the vehicle without the use of additional transmitter means in the vehicle and without the necessity for stand-by receiving apparatus at the remote control point.

It is also an object of the invention, to provide an improved remote control system for automotive vehicles and the like which utilizes the high voltage ignition system as a primary source of control energy and simple and effective means for deriving the energy and for tuning such system to a predetermined frequency for remote control purposes.

In accordance with the invention, a simple contact device is provided in the vehicle adjacent to the motor block for engaging selectively one of the spark plug terminals to derive therefrom high voltage energy which is thereby transmitted through a simple tuned circuit and radiated to a remote point from the vehicle at a predetermined frequency. In one embodiment of the invention the radiator device and tuning means are combined in one inductive element in a simple series tuned circuit which is selectively connectable to the high voltage terminal of one of the spark plugs, or the high tension circuit connected therewith, through dashboard operated relay or push button means. In either case, the inductance of the high tension ignition circuit and the discharge gap of one of the spark plugs is utilized as a high frequency oscillation generator for an impulse transmitter having a predetermined tunable output frequency.

At the receiving end, use is made of a relay controlled by simple coherer or gas filled tube means responsive to the received radio wave picked up on any suitable antenna and tuned circuit arrangement well known in the radio art. Nearly all garage door and like operating systems employ a reversible electric motor, generally of the alternating current type, connected to the ordinary power supply means provided in buildings and dwellings and the adaptation of such a system to remote radio wave control is well known. Accordingly, the system in accordance with the invention presents no problem in its application to existing manually controlled doors and the like for remote control from a vehicle at a remote point therefrom.

Since the distance between the vehicle and the control apparatus is generally short, not only can the low power energy of the high tension system be utilized for control purposes as aforesaid, but also a simple receiving means responsive to low amplitude radio energy may be utilized to advantage, in accordance with the invention.

It may also be considered, therefore, to be an object of the invention, to provide a signal impulse generating, controlling and transmitting means for automotive vehicles and the like, for actuating remotely controllable apparatus, without the necessity for the operator of the vehicle dismounting therefrom, and without the necessity for providing auxiliary apparatus along or in the path of the vehicle such as coils or other devices buried in the driveway or located along posts and other supports between the vehicle and the controlled mechanism or apparatus, as has heretofore been required by known prior art systems of that character.

The novel features that are considered characteristic of this invention are set forth with particularity in the appended claims. The invention, both as to its organization and method of operation, as well as additional objects and advantages thereof, will best be understood from the following description when read in connection with the accompanying drawings, in which Figure 1 is a view in perspective and partly in cross-section showing one embodiment of the invention as applied to an automotive vehicle for the transmission of radio waves in accordance with the invention, Figure 2 is a further schematic diagram of the system shown in Figure 1, Figure 3 is a schematic circuit diagram showing a modification of the invention as disclosed in Figures 1 and 2, Figure 4 is a view in perspective of a building such as a garage provided with receiving and operating means in accordance with the invention, and Figure 5 is a further schematic circuit diagram of the receiving and operating means shown in Figure 4.

Referring to Figures 1 and 2, wherein like parts are designated by the same reference numerals, an automotive vehicle 10 is provided with a push button switch 11 on or adjacent the dashboard 12 thereof having a manually operable control button 13 by which it is actuated to open and close a connection between control leads indicated at 14 and 15. In this arrangement, the car battery, indicated at 16 in Figure 2, is utilized as a source of energy for energizing an electromagnet or relay coil 17 located in a control box 18 on the opposite side of the dashboard from the push button 13. The coil 17 is provided with a magnetic core 19 which is arranged to attract the relay armature element 20 mounted on and insulated from a pivoted conductive contact element or lever 21, the pivot point of which is indicated at 22. The contact element is arranged in such a manner that as the control circuit is energized from the battery through the leads 14 and 15, the switch 11 and the control winding 17, the armature element is moved in a direction to carry the free end of the contact element downwardly into contact with the terminal 23 of the rearmost spark plug 24 on the motor block 25 under the hood of the vehicle.

The contact element 21 is normally held against a suitable insulated stop 26 by action of a retracting spring 27, and stands in spaced relation at its free end with respect to the spark plug terminal, by a distance sufficient to prevent the high tension from jumping thereto in normal operation.

With this arrangement, the pivot point 22 and the forward or free end of the element 21 is insulated from the rear end thereof, as indicated at 28, to prevent the flow of high voltage to associated portions of the control box, and an output coupling connection is provided through a capacitor 30 to a combined tuning inductance and radiator coil indicated at 31, which is grounded as indicated at 32. There is thus provided a series tuned high frequency circuit between the arm 21 and ground.

The series tuned circuit is actively connected with the high voltage oscillation generating system provided by the ignition system when the control button 13 is operated to energize the winding 17 and to bring the conducting portion of the arm 21 into engagement with the high potential terminal of the ignition system, which in the present example is the terminal 23 of the spark plug with which it is associated. Energy then flows in the circuit 30—31—32 and electromagnetic radiations are derived from the inductance 31, which as shown in Figure 1, may be located below the running board of the vehicle or in such other exposed location that it is not completely shielded by the metal structure of the vehicle, and may be of the flat spiral, pan-cake type, as shown.

Such radiations in the form of pulses, keyed by operation of the control button, may then be picked up by suitable means responsive thereto, as will hereinafter be described, for actuating any desired apparatus remotely located with respect to the vehicle but preferably within range of the low power transmission provided by this system. This has the advantage that it does not offer interference to radio and other sensitive apparatus which may likewise be located in the neighborhood of the controlled apparatus. Since the coil and capacitor 30 and 31 are broadly tunable to a predetermined frequency, a certain degree of selectivity in the operation of the system is further provided for eliminating interference, which in any case is of short duration.

Referring now to Figure 3 and the modification of the invention shown therein, like reference numerals as in Figures 1 and 2 refer to like parts. It will be seen that the conducting contact element or arm 21 is arranged to engage the terminal 23 of the spark plug 24 in the same manner as in the preceding embodiment. The arm is arranged to project from a control box 35, with the inner end of the arm pivoted as indicated at 36 and provided with an upturned end 37 of bell-crank form, to which is loosely connected a push rod 38 of insulating material which in turn projects rearwardly through the dashboard 12 of the car to terminate in a push button 39 mounted in a suitable escutcheon plate 40 on the dashboard.

The rod is provided with a stop pin 41 which engages the casing 35 to limit the upward movement of the lever 21 under action of a compressed return spring 42 located between the outer wall of the casing and a washer 43 fixed to the push rod 38 as shown, representing any suitable arrangement for limiting the movement of the lever 21 between a raised position as shown and a lowered position permitting full movement of the lever into contact with spark plug terminal 23 when the button 39 is depressed.

This mechanical arrangement may be provided in automotive and other vehicle installations where it is desired to eliminate the use of the starting battery or other source of electrical energy for operating the selectively controllable connection to the spark plug or high voltage system for deriving the high frequency pulse. This arrangement is preferred in that the spark plug is conveniently located for applying a releasable contact with the high voltage system, and the control element per se may be mounted under the hood generally, and supported by the rear of the dash or fire wall of the vehicle, for example as shown in Figure 1.

The modification shown in Figure 3 further provides tuned transformer coupling means for applying energy to be radiated to an insulated rod or "whip" type radiator indicated at 45, which may be mounted on the control box and suitably insulated therefrom or located at any other suitable position on the vehicle as may be desired.

The radiator or antenna is connected through a lead 46 with a tuned grounded secondary winding 47 which is inductively coupled to a primary winding 48. The latter is coupled through a series tuning and isolating capacitor 49, with the contact element 21. The circuit comprising the capacitor 49 and the inductance or primary 48 thus provides a series tuned circuit responsive to a predetermined frequency or radiation. Thus with a tuned primary circuit and a tuned secondary or antenna circuit, the system provides for efficient radiation at a predetermined frequency.

While the invention has been described in connection with a system for controlling the opening and closing of garage doors and the like, it may be applied to any remotely controlled apparatus. In the present example, any suitable operating mechanism may be provided for operating the doors as the specific means does not form part of the present invention. Therefore, only a general operating mechanism and apparatus controlled thereby is herein illustrated and described for purposes of illustration only, as will be seen with reference to Figure 4, wherein a system as above, is shown as adapted for response to the transmitter or control means of Figures 1, 2 and 3, to control the opening and closing of the main doors 55 of a garage 56. The door operating mechanism per se includes a reversible electric operating motor 57, a gearing box 58 for reducing the speed of the motor and having a shaft 59 connected with a door operating linkage or mechanism indicated generally at 60. This may be placed under manual control in any suitable manner as normally provided in such installations.

Further in accordance with the invention, the motor is connected, through a relay 62, with power supply leads 63 for supplying energy to the motor through the relay. The motor, in turn, is controlled by control potentials derived from a radio receiver 64 the antenna and ground means of which are indicated at 65 and 66 respectively. The antenna connection may be a single wire as shown, mounted on insulating supports under the roof of the garage structure, and the ground connection may be provided directly to earth as indicated. The receiver means 64 is likewise arranged to be energized from the same supply leads 63 as the motor and has a common connection therewith as shown.

The receiver is responsive to pulses received from the transmitter system upon operation of the control button in the vehicle and serves to operate the motor in one direction or the other to open or close the doors in response to a single pulse. The relay 62 may be of the type which presets the system for operation in the opposite direction upon receiving a pulse and resulting delayed control effect from the receiver. That is to say, if the doors are closed, a received pulse will cause them to open and if they are open a received pulse will cause them to close. In other words, a slow succession of pulses from the control point in the vehicle causes the door alternately to close and to open through operation of the relay in response to a control current from the receiving means. A series of rapid pulses as from a spark plug have only the effect of one pulse due to the time lag in the receiving and control system for the door operation, including certain relays.

A local push button controlled switch 70 in the garage may be provided for manual operation of the system and for this purpose is connected in any suitable manner, or to the receiver, through leads indicated at 71. The operation of this system will further be described with reference to Figure 5 to which, along with Figure 4, attention is now directed, and in which a preferred form of receiver and relay for responding to received pulses and for controlling the reversible motor are shown.

The receiver 64, indicated by the dotted outline, may comprise an untuned primary input winding 75 connected with the antenna 65 and to ground through the lead 66. The primary winding is coupled to a tuned secondary 76, the high signal potential terminal 77 of which is connected through a coherer or other signal responsive detector device 78 with a signal output lead 79. The coherer may comprise a relatively small tubular body having a small iron plug 80 closely spaced therein with similar carbon or iron plug 81, and having a bead of mercury 82 in contact with both plugs within the body of the coherer. This represents any suitable detector device which does not require power for standby operation. The additional advantage in the use of the present device lies in the fact that it automatically decoheres upon cessation of a signal pulse and reopens the circuit.

Signals received through the input circuit 76, which is tuned to the frequency of the transmitter, cause operation of the coherer and provide a conductive connection between the plugs 80 and 81. It thus acts as a pulse operated switch which automatically reopens after each pulse. The high frequency circuit through this electronic switch is completed by an R.-F. bypass capacitor 83 connected between the lead 79 and the low potential or ground terminal 85 of the input circuit 76. The coherer 78, as a switch element, is interposed in circuit between the output terminal 87 of a full-wave contact rectifier 88, energized at low voltage through a transformer 89 from leads 90 connected with the supply leads 63.

The circuit through the coherer may be traced from the terminal 87 through an R.-F. choke coil 92, the coherer 78, the lead 79, thence to one of the leads 71 to the control box 70, thence to a fixed contact 93, a push button operated contact 94 back through another of the leads 71 to the relay 62 and a pivoted contact element 95 therein. This contact element is part of an armature pivoted at 96 to move under control of relay actuating coils 97 and 98 having a connection with a pair of contacts 99 and 100. The windings 97 and 98 also have a common circuit connection 101 back to the rectifier 88 and the remaining output terminal 102 thereof.

The contacts 99 and 100 are arranged to be closed by alternate operation of the movable bar contact 95 of the relay in response to energization of the windings 97 and 98 and the windings are arranged, as shown, to be energized alternately through closure of a circuit between the contact bar 95 and the contacts 99 and 100. The bar is further provided with magnetic elements 105 and 106 which cooperate with the cores 107 and 108 for the coils 97 and 98, respectively, to hold the armature in the one or the other position by the residual magnetism between the core and the magnetic elements 105 and 106 when moved into engagement therewith as shown. For example, in the drawing, the position of the armature is such that the element 105 is substantially in contact with the core 107 for the coil 97.

Since the contact 100 is connected with the coil 98, energization of the relay will cause the contact bar 95 to shift to the opposite position with the element 106 in contact with the relay core 108 and closing the contact 99 with the bar 95 so that the coil 97 is energized upon the next operation of the system. The operating circuit for the relay thus is completed upon each pulse through the coherer 78 or other suitable device for the purpose. Responsive to the high frequency pulses the relay is selectively energized to shift the position of the armature alternately. In other words, successive pulses of current are triggered by the received signal and the actual energy for operation of the relay magnets is derived from the rectifier 88. Any other ratchet or stepping type relay may, however, be used if desired. Since this is a contact or tubeless rectifier device, it provides a long operating life and is dependable in operation without attention. No other power source and no stand-by receiving system are required.

When it is desired to operate the relay manually, the control switch 79 is operated by means of a button 110 to close the movable contact 94 to a second fixed contact 111 which is connected through one of the leads 71 to the output terminal 87 of the rectifier 88. It will thus be seen that when these contacts are closed, connection to the coherer is broken and the current is permitted to flow from the terminal 87 through the contacts 111 and 94, thence to the relay armature 95, the contact 100 and the coil 98, thence through the lead 101 to the opposite terminal 102 of the rectifier 88, thereby causing the relay to operate.

It will be noted that the rectifier 88 is provided with a shunt fixed load resistor 115 and a shunt bypass capacitor 116 therefor, which, together with the choke coil 92, serves to isolate the D.-C. system from the high frequency tuning circuit 76 and the normal detector function provided by the coherer 78.

The relay serves to operate the motor 57 also indicated in dotted outline in Figure 5. This may be any suitable reversible type, having, in the present example, a running winding 115 and a reversing winding 116, the latter being connected through leads 117 with a second pair of contacts 118 and 119 in the relay, which are, in turn, associated with a second contact bar 120 of conducting material carried by and insulated from the bar 95. This serves alternately to contact with the reversing contacts 118 and 119 for the motor and connects such contacts through a lead 121 with one of the supply leads 63. The opposite supply lead is connected through a lead 122 with a center tap on the reversing winding 116 of the motor.

This arrangement serves to reverse the motor operation in response to operation of the relay, thereby opening or closing the doors, as the case may be, in the present example. Suitable limit switches 125 and 126, in the motor or provided at any suitable point as described, serve to limit the operation of the motor when the function of closing and opening the doors has been completed. The armature of the motor is indicated at 127 and the operating shaft at 128.

As such reversible motor control arrangements are old and well understood, and since the door operating means, per se, does not form part of the present invention, further description of the motor and door mechanism connected therewith is believed to be unnecessary.

From the foregoing description it will be seen that a simplified system may be provided for the remote control of any reversible motor driven mechanism, through the transmission of high frequency pulses derived by a controllable contact element from a high voltage ignition system, without the use of any electron tube transmitter equipment as ordinarily required and that the derived signal may be transmitted at a predetermined high frequency through a tunable circuit a portion of which may include a tuning inductance which operates as a signal radiator.

The controlled equipment for effecting operation of the reversible motor may include a simple coherer-type, high-frequency-responsive, tuned system involving no standby apparatus other than a simple copper oxide or other contact rectifier which in itself has no heated cathode element or moving parts.

The system has the further advantage that no special equipment is required for transmitting or receiving the signal and no additional pick-up mechanism or equipment is required along the path of the vehicle, such as buried coils or wires suspended on posts, both of which are difficult to install and maintain. The inductance of the high tension circuit and the oscillatory spark gap provided by a spark plug, for example, provide the high frequency generating means in connection with the tuned circuit through which the oscillations are transmitted.

While the system has been shown and described in its application to automotive vehicles and the like, it is obvious that it may be applied in a similar manner to any installation where a high frequency spark system is available to supply the high frequency energy, and where the high frequency signal may be used for remote control purposes when supplied in the form of single pulses of any suitable duration.

I claim as my invention:

1. The combination with an automotive device having a high voltage ignition system provided with a high voltage terminal, of means for transmitting pulsed signals therefrom at a predetermined high frequency, comprising a conductive lever arm pivotally mounted to engage said terminal in response to a control operation at a predetermined point, a tunable high frequency circuit coupled to said conductive lever arm, and means for radiating high frequency energy coupled to said circuit.

2. In a remote control system for automotive vehicles and the like, the combination with a high tension ignition circuit having a high voltage discharge gap provided by a spark plug and a predetermined inductance, of means for producing pulsed signals therefrom comprising a conductive contact element selectively connectable to said high tension circuit adjacent one side of said discharge gap, and a high frequency tunable circuit responsive to a predetermined high frequency, having one side connected to the other side of said discharge gap and its other side connected with said contact element to receive high frequency energy when said contact element is in contact with said ignition circuit, thereby to provide a high frequency oscillation generator having a predetermined pulsed signal output frequency.

3. In a remote control system for automotive vehicles and the like, a pulsed high frequency oscillation generator comprising in combination, a high tension ignition circuit having a high voltage spark gap provided by a spark plug and a predetermined inductance, a conductive contact element selectively movable from a position of spaced disengagement to a position of contact with said high tension circuit adjacent one side of said spark gap, control means responsive to manual operation for moving said element between said positions, a tuned high frequency circuit responsive to a predetermined frequency, having one side connected to the other side of said spark gap and its other side connected with said contact element to receive high frequency energy therethrough from said high tension circuit to provide a signal pulse, and means for radiating said pulse.

4. The combination with a high voltage ignition system having a high voltage terminal and a spark gap provided by a spark plug connected at one side to said terminal, of an insulated conductor element movable for selectively contacting said terminal to derive high frequency energy therefrom, a series tuned high frequency circuit, having one side connected to the other side of said spark gap and its other side connected with said conductor element for receiving said energy in response to movement of said element into contact with said terminal, and a tuned antenna circuit inductively coupled to said first named circuit and operative to radiate said energy substantially at a predetermined frequency for actuating remotely located equipment in response thereto.

ALF H. HOFBERG.

REFERENCES CITED

The following references are of record in the file of this patent:

UNITED STATES PATENTS

| Number | Name | Date |
|---|---|---|
| 1,372,751 | Hogan | Mar. 29, 1921 |
| 1,702,011 | Kuppers | Feb. 12, 1929 |
| 1,760,479 | Colman | May 27, 1930 |
| 1,797,085 | Galbusera | Mar. 17, 1931 |
| 2,188,224 | Kathriner | Jan. 23, 1940 |